United States Patent [19]

Jones

[11] Patent Number: 4,881,492

[45] Date of Patent: Nov. 21, 1989

[54] BREAK-AWAY COLLAR COUPLING DEVICE

[76] Inventor: Jeff R. Jones, 14575 Kennebunk St., Poway, Calif. 92064

[21] Appl. No.: 897,593

[22] Filed: Aug. 18, 1986

[51] Int. Cl.$^4$ ............................................. A01K 27/00
[52] U.S. Cl. ...................................... 119/106; 24/478
[58] Field of Search ...... 119/106; 24/135 N, 265 EC, 24/477, 478, 580, 588, 602, 697, 685, 701

[56] References Cited

U.S. PATENT DOCUMENTS

| 754,358 | 3/1904 | Spohn | 24/265 EC |
|---|---|---|---|
| 2,612,139 | 9/1952 | Collins | 119/106 |
| 2,900,696 | 8/1959 | Bacon | 119/106 X |
| 3,589,341 | 6/1971 | Krebs | 119/106 |
| 4,031,859 | 6/1977 | Stewart | 119/106 |
| 4,044,725 | 8/1977 | Miller | 119/106 |
| 4,577,375 | 3/1986 | Beaussant | 24/580 |

FOREIGN PATENT DOCUMENTS 2732636  2/1979  Fed. Rep. of Germany ...... 119/106

Primary Examiner—Robert P. Swiatek
Attorney, Agent, or Firm—Frank D. Gilliam

[57] ABSTRACT

Plug and socket members of a break-away animal collar coupler are affixed to opposite end portions of a collar, each by a screw vising and optionally penetrating a collar end portion disposed in a cavity defined by an angular base member. In several embodiments the socket member comprises a second plug and a socket housing defining at opposite ends two sockets adapted to engage the plugs. The plugs are rigid and the socket housing is rubberized so as to disengage with a plug when a component of a force applied to the collar is of sufficient magnitude and in a direction urging disengagement. In an alternative embodiment, there is only one plug member and prongs of the plug member are rubberized whereas the socket has within it rigid shoulders which catch the prongs.

14 Claims, 2 Drawing Sheets

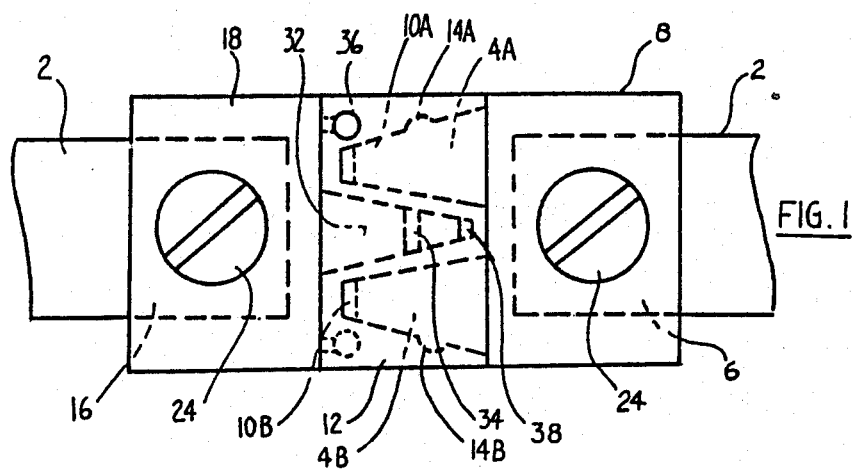
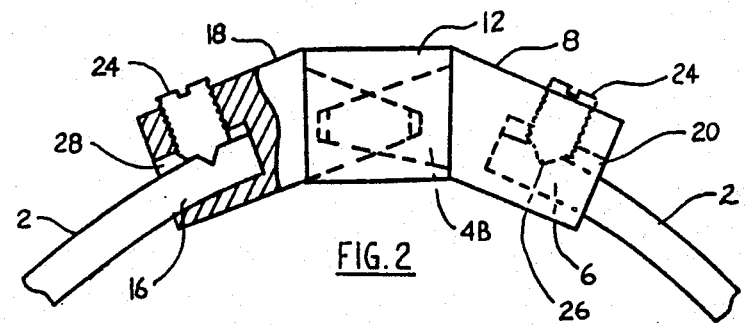
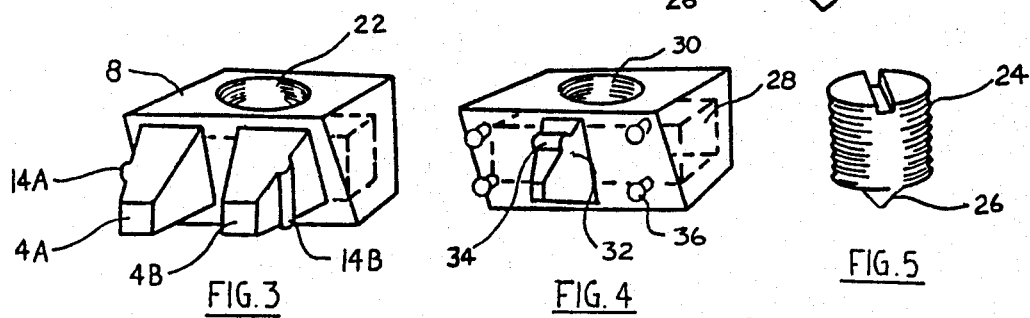
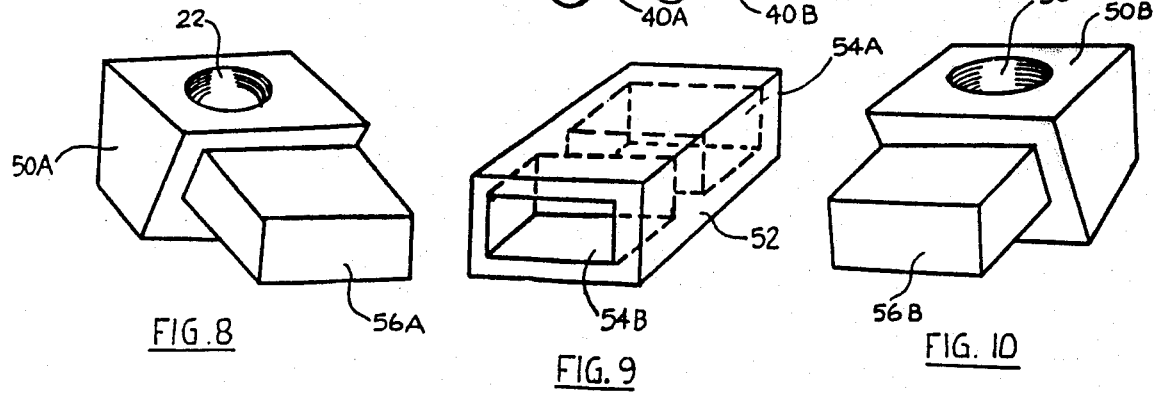

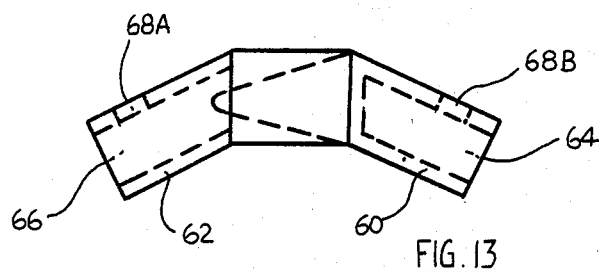
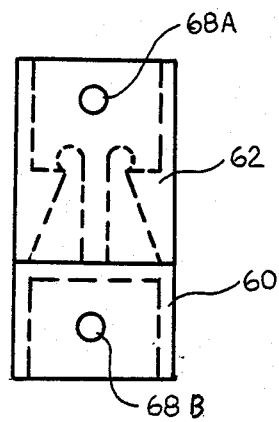
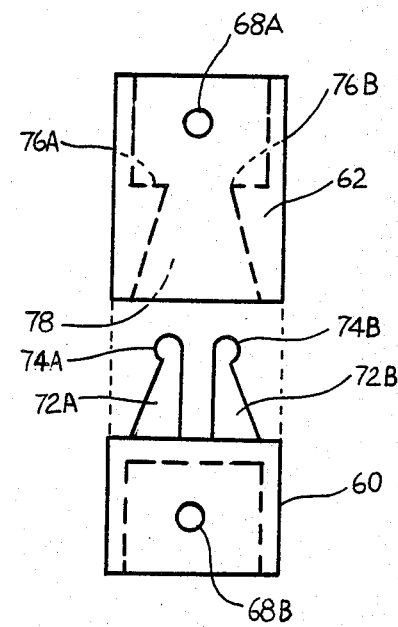
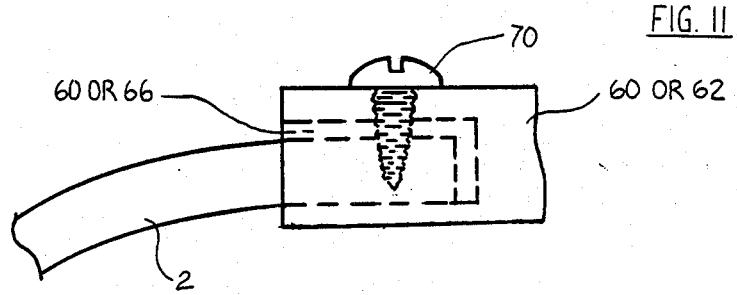

BREAK-AWAY COLLAR COUPLING DEVICE

BACKGROUND OF THE INVENTION

This invention relates in general to coupling means for collars, belts, and the like, and in particular to those coupling means which break-away or decouple when a force of predetermined or greater level is applied to the collar urging the coupling means to decouple.

Advantages and attributes of this invention will be readily discernible upon a reading of the test hereinafter.

SUMMARY OF THE INVENTION

This invention presents a break-away collar coupling means comprising a plug means adapted to be angularly affixed to a first end of the collar, a socket defined by a socket housing adapted to couple with the plug means, in several embodiments the socket housing being adapted to resiliently flex sufficiently to defeat a latching means holding the plug means in the socket whenever a suitable force urging separation of the socket means and the plug means is applied to the collar, and a means to angularly affix the socket means to a second end of the collar. The plug means coupled with the socket means and together with the socket affixing means form a generally convex arc. The plug means is held coupled to the socket means by a plurality of protuberances projecting laterally from the plug means being disposed in corresponding and conforming depressions defined by the socket means. The protuberances are preferrably ridges or semi-spherical bumps. The plug means can be a single prong or a plurality of prongs, preferrably two. For multiple prongs the protuberances are disposed on the outboard sides of the outboard prongs. In several embodiments, the socket means is preferrably made of rubber, or rubberized plastic such that it is significantly more resiliently flexible than the plug means. In an alternative embodiment, the socket means is rigid and the prongs are significantly more resiliently flexible than the socket means to selectively defect the latching of the prongs. This permits them to decouple even though the decoupling force is divergent from a line of coupling.

An object of this invention is to provide a break-away coupling means for collars worn by pet animals, such as cats and dogs, to prevent injury to said pet animals when said collars get hooked by branches, fence boards, and the like.

A further object of this invention is to provide a breakaway collar coupling means which forms a lineal arc consistent with the general curvature of the collar.

A further object of this invention is to provide a quick and easy means to affix a collar coupler to the ends of the collar.

Other objects of this invention will be discussed and readily discernible upon a reading of the text hereinafter.

BRIEF DESCRIPTION OF THE DRAWINGS

FIG. 1 is a plan view of the collar coupling device.

FIG. 2 is a side view with partial section of the device.

FIG. 3 is a perspective view of a plug means and a plug affixing means.

FIG. 4 is a perspective view of a socket housing affixing means.

FIG. 5 is a perspective view of a vising means.

FIG. 6 is a perspective view of the back side of the piece shown on FIG. 3.

FIG. 7 is an alternative plug means and plug affixing means.

FIGS. 8, 9 and 10 are perspectives of an alternative collar coupling device.

FIG. 11 is an exploded view of an alternative embodiment of this invention.

FIG. 12 is a plan view of an alternative embodiment of this invention.

FIG. 13 is a side view of an alternative embodiment of this invention.

FIG. 14 is a side cutaway view of either end of the coupling device being affixed to an end of a collar.

DESCRIPTION OF THE PREFERRED EMBODIMENT

Referring to FIGS. 1 through 6, FIG. 1 shows the device of this invention being used to couple collar 2. A first plug means which can comprise a pair of truncated pyramidal prongs 4A and 4B projecting angularly from a common base member 8 is shown affixed to a first end 6 of the collar 2. The first plug means is disposed in a socket means comprising a pair of sockets 10A and 10B defined by a socket housing 12. The socket means generally conforms to the first plug means which is held therein by a latching means. An example of a latching means is shown to comprise a pair of protuberances 14A and 14B projecting laterally from prongs 4A and 4B, respectively, and disposed in corresponding and conforming depressions defined by the socket means.

The socket housing 12 is affixed to a second end 16 of the collar 2 by an affixing means 18. The socket housing affixing means 18, the socket housing 12, and the first plug base member 8 together form generally a lineal arc. The arc is especially shown in FIG. 2. The arc generally conforms to a curvature of the collar which allows for a better fit of the collar and reduces or eliminates any irritation which may be associated with the device. The arc has the further advantage of reducing the amount of pull required to break apart the device when the pull is caused by a prying force located beneath or nearly beneath the device. Such could occur in the case of a pet flea collar being coupled by the device of this invention, for example, if a branch hooked the collar right beneath or nearly beneath the device.

Referring to FIGS. 1, 2, 3, 5 and 6, the first plug base member 8 is shown to be clamped to the first end 6 of the collar 2. The clamping means comprises a cavity 20 defined by the first plug base member into which the first end 6 is inserted. A wall of the cavity defines a threaded through-bore 22 adapted to receive a set screw 24. The end of the set screw acts as a movable jaw and an opposing wall of the cavity 20 acts as an opposing fixed jaw, and between them the first end 6 is vised. It is advantageous if the end of the set screw is tapered to a point 26 adapted to penetrate the collar to further hold the collar between the jaws.

One such plug member can be a prong 32, similar to the prongs 4A and 4B of the first plug means (FIG. 3), having a lateral ridge type protuberance 34 for catching in a corresponding recess or depression in a socket 38 defined by the socket housing 12. Additional plug members are ball plugs 36 which seat in ball sockets defined by the socket housing.

Referring to FIGS. 1, 2, 4 and 5, the socket housing affixing means 18 is a base member defining a cavity 28, and a threaded through-bore 30 adapted to receive a set screw 24 with a tapered end 26. The cavity and set screw act to clamp onto and vise the second end 16 of the collar in similar fashion as hereinabove described for the first plug member. Both base members preferably are made from a hard, rigid plastic, but the socket housing is made from a suitably more flexible plastic, such as a rubberized plastic. The socket housing is angularly affixed to the base member 18 by any suitable means, preferably by plug members engaging sockets defined by the socket housing.

Referring to FIG. 7, an alternative embodiment of a plug means is shown to have a pair of prongs 40A and 40B in the form of conoids.

Referring to FIGS. 8, 9 and 10, an alternative embodiment of this invention is shown to comprise a plug means 50A, a socket affixing means 50B, and a socket housing 52. The plug means 50A and the socket affixing means 50B can be identical, each having a single prong, 56A and 56B respectively, projecting therefrom, and each prong being adapted to engage a socket, 54A and 54B respectively, defined by the socket housing 52.

Referring to FIGS. 11-14, an alternative embodiment of this invention is shown to have only two major pieces, a plug means 60 and a socket means 62. Both pieces are clamped to opposite ends of a collar 2 by having the ends of the collar disposed in cavities 64 and 66, defined by the plug means and the socket means, respectively. A wall of each cavity defines a through-hole, 68A and 68B, through which a suitably sized self-tapping screw 70 is screwed into the collar 2. The plug means has two integral prongs 72A and 72B affixed thereto, and each prong is tapered in the form of a truncated rectangular pyramid with a protuberance, 74A and 74B, projecting from an outboard side of its remote extremity. The protuberances are adapted to catch on a pair of sharp angled shoulders 76A and 76B, respectively. The socket means is made from hard, rigid plastic whereas the prongs are made from a more flexible plastic such as a rubberized plastic in order for the prongs to resiliently flex and become uncaught whenever a component of a force applied to the collar is of suitable magnitude and in a direction urging the coupling means apart. The shoulders are integral with and projection inwardly from inside walls of a prong receiving cavity 78 defined by the plug means 62.

It should be noted that the means used to clamp the alternative embodiment as discussed in the preceding paragraph, that is, the through-hole and the self-tapping screw, can be used in all embodiments of this invention including the embodiments of FIGS. 1 through 10, in which case the unthreaded through-holes 68A and 68B would replace the threaded through-holes 30 and 22, respectively, and the self-tapping screw 70 would replace the screw 24.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A collar coupling means comprising:
    (a) a plug means,
    (b) means angularly affixing the plug means to a first end of a collar,
    (c) a socket means defined by a socket housing and generally conforming to the plug means,
    (d) means angularly affixing the socket housing to a second end of the collar, the plug means affixing means, the socket housing affixing means together generally forming an arc when the plug means is disposed in the socket means;
    (e) said means for angular affixing the plug means and the means angularly affixing the socket means each comprising, (a) an angular base member, (b) a cavity defined by the base member adapted to have disposed therein an end portion of the collar, (c) a through-hole defined by a wall of the cavity, an axis of the through-hole intersecting the collar end portion disposed in the cavity, and (d) a screw means adapted to engage the through-hole and to vise the collar end portion between the screw means and a wall of the cavity opposite the through-hole,
    (f) latching means for releasably latching the plug means in said socket means, the latching means being suitably resiliently flexible to allow the latching means to be defeated by a force of a predetermined magnitude applied to the collar in a direction which urges separation of the socket means from the first plug means.

2. The collar coupling means of claim 1 wherein the latching means is a plurality of prongs projecting from the plug means toward the socket, each prong having at least one protuberance projecting laterally therefrom and adapted to be caught by a shoulder projecting from a side of the socket.

3. The collar coupling means of claim 2 wherein the plug means comprises two prongs and the protuberances are disposed on the outboard sides of the prongs.

4. The collar coupling means of claim 2 wherein the protuberances are disposed on the outboard sides of the prongs.

5. The collar coupling means of claim 2 wherein the prongs are beveled such that they each generally form a truncated pyramid.

6. A break-away collar coupling device comprising:
    (a) a first plug means,
    (b) means affixing the first plug means to a first end of a collar,
    (c) a socket means defined by a socket housing and generally conforming to the first plug means,
    (d) means for affixing the socket housing to a second end of the collar, and
    (e) means for releasably latching the first plug means in said socket means comprising a plurality of projecting protuberances and a corresponding and conforming plurality of depressions for latching said protuberances, the latching means being suitably resiliently flexible to allow the latching means to be defeated by a force of predetermined magnitude applied to the collar in a direction which urges separation of the socket means from the first plug means.

7. The break-away collar coupling device according to claim 6 wherein the socket housing is suitably resiliently flexible to allow the tapered prong protuberances to become uncaught whenever said force is applied.

8. The break-away collar coupling device according to claim 7 wherein the tapered prongs are in the form of truncated pyramids.

9. The break-away collar coupling device according to claim 7 wherein the tapered prongs are in the form of truncated conoids.

10. The collar coupling means of claim 7 wherein the means to affix the socket means to the second end of the collar comprises:
(a) a second plug means affixed to the second end of the collar, and
(b) a second socket means defined by the socket housing and adapted to receive therein and hold therein the second plug means.

11. The break-away collar coupling device according to claim 6 wherein the tapered prongs are in the form of truncated pyramids.

12. The break-away collar coupling device according to claim 6 wherein the tapered prongs are in the form of truncated conoids.

13. The collar coupling means of claim 6 wherein the means to affix the socket means to the second end of the collar comprises:
(a) a second plug means affixed to the second end of the collar, and
(b) a second socket means defined by the socket housing and adapted to receive therein and hold therein the second plug means.

14. The break-away collar coupling means of claim 6 wherein the means affixing the first plug means and the means affixing the socket means each comprises:
(a) an angular base member,
(b) a cavity defined by the base member adapted to have disposed therein and end portion of the collar,
(c) a through-hole defined by a wall of the cavity, an axis of the through-hole intersecting the collar end portion disposed in the cavity, and
(d) a screw means adapted to engage the throughhole and to vise the collar end portion between the screw means and a wall of the cavity opposite the through-hole.

* * * * *